INVENTOR
William W. Miner
Lynn F. Johnson
ATTORNEYS

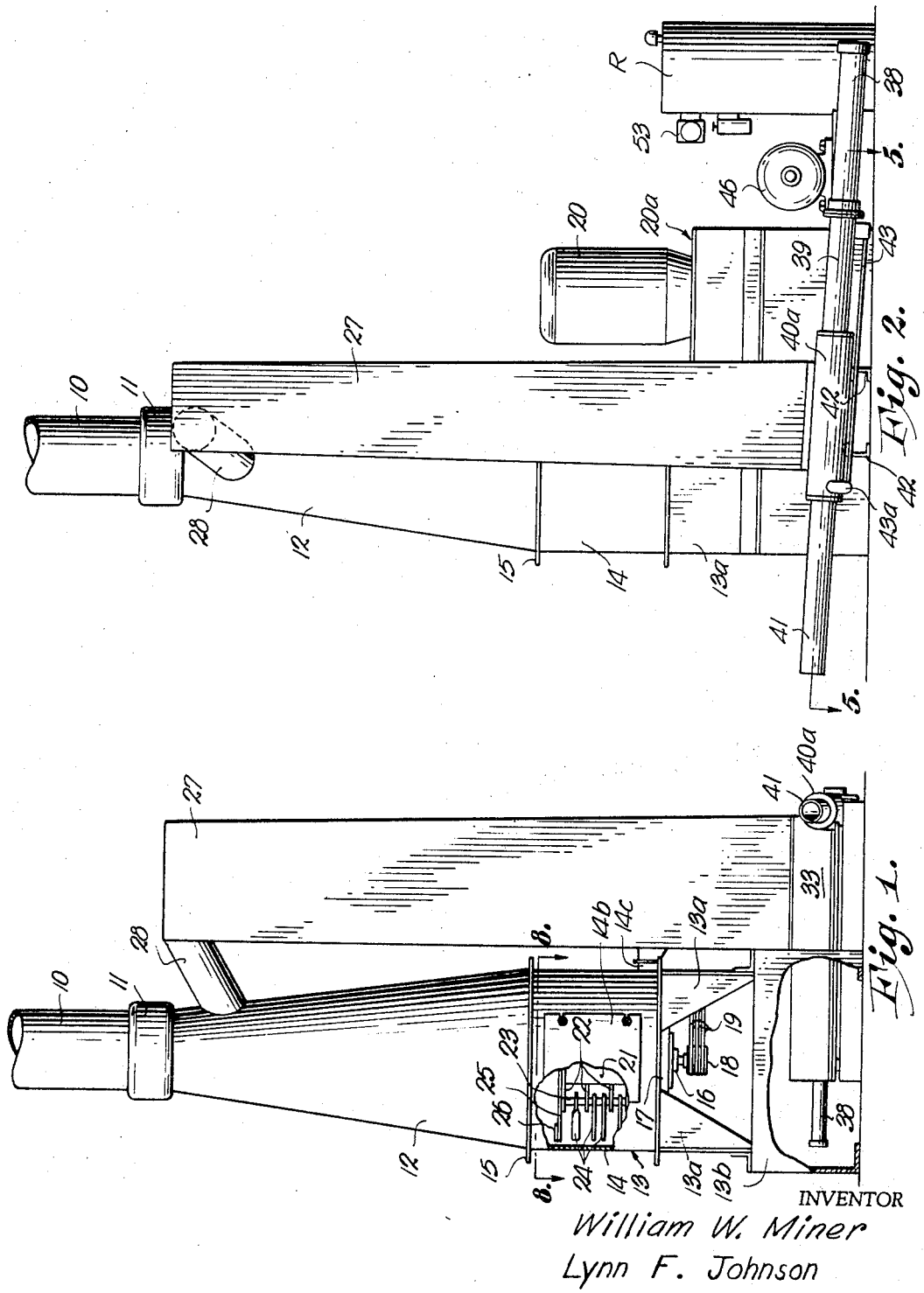

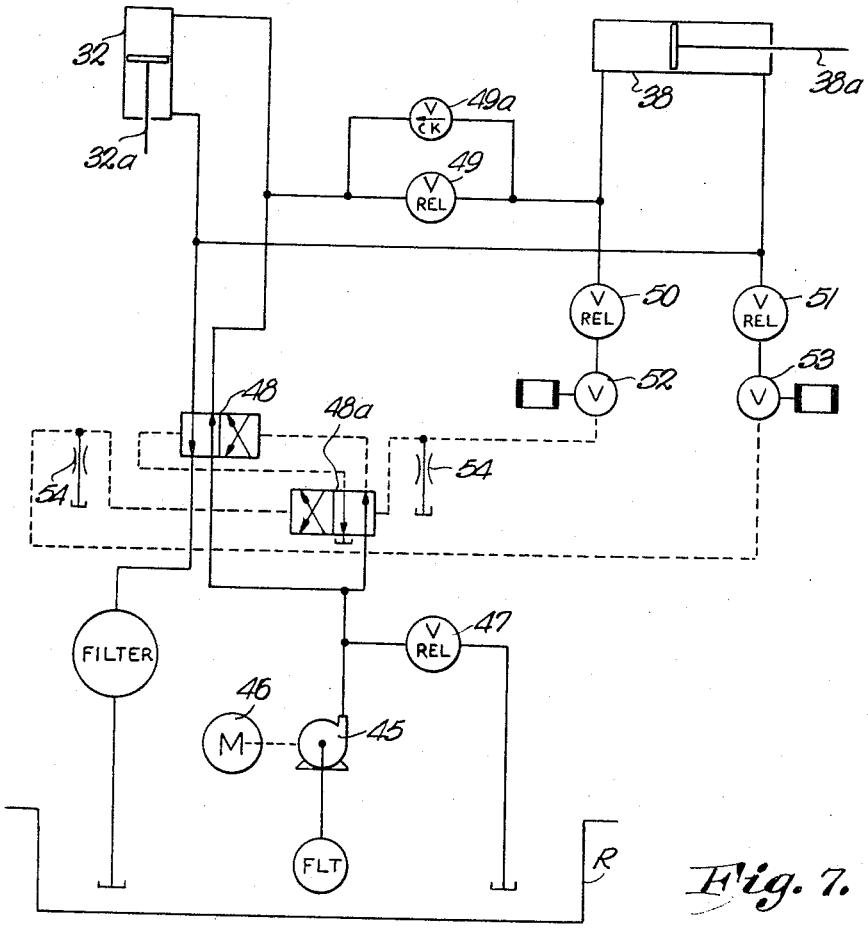
Fig. 7.
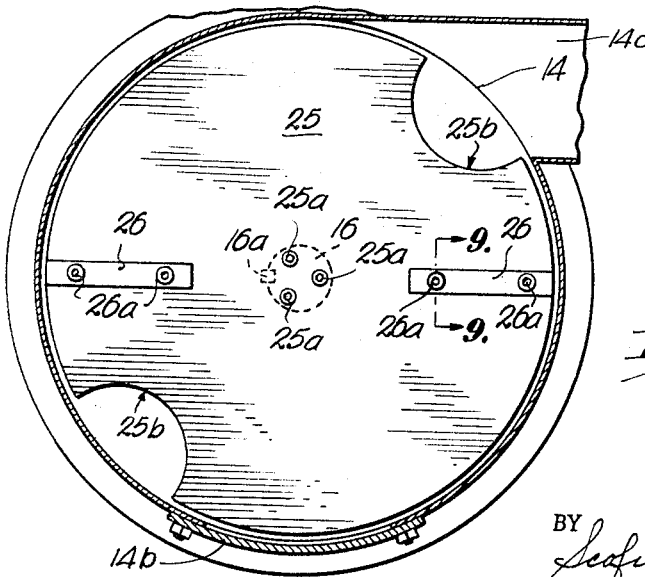
Fig. 8.
Fig. 9.
INVENTOR
William W. Miner
Lynn F. Johnson
BY Seafield, Kokjer, Seafield & Lowe
ATTORNEYS Patented Feb. 11, 1969

3,426,673
METHOD AND APPARATUS FOR PROCESSING
WASTE MATERIAL
William W. Miner and Lynn F. Johnson, Cranbury, N.J., assignors, by direct and mesne assignments, to SFM Corporation, a corporation of New Jersey
Filed Mar. 30, 1967, Ser. No. 627,100
U.S. Cl. 100—37
Int. Cl. B30b 9/04, 1/32; B02c 9/04
12 Claims

ABSTRACT OF THE DISCLOSURE

A method of processing waste materials such as garbage and trash which includes the steps of controlling the flow of the waste material to a grinder, grinding said waste material into substantially smaller particles, transferring the particles to a compacter, and compacting said particles into a substance having a volume substantially less than the original volume of said waste material.

This method is principally accomplished by use of a two-stage reduction mill in combination with a hydraulically operated compacter. The reduction mill operates as a self-contained unit to control the flow of waste material to a final grinding stage where hammermill flails comminute the waste material. The air draft created by the rotation of the hammermill flails assists the transfer of the comminuted material to a loading hopper of the compacter. A first hydraulic ram operates to load the packing chamber of a final compacter and a second hydraulic ram operates in a correlated manner with the first to effectively compact the comminuted waste material into a substance having a volume significantly less than the original volume of the waste material.

*Background and brief summary of the invention*

The problem of air pollution has become worldwide. Practically every city is faced, from time to time, with a noxious blanket of virtually poisonous air which is suspended over much of their entire area. In many instances, when an atmospheric phenomena called temperature inversion occurs, normal air circulation is prevented and serious illness and deaths often result. For example, the polluted air conditions at Donora, Pa., in 1948 resulted in over 20 deaths and in nearly 6000 of the town's 14,000 residents becoming ill. London has had several pollution conditions such as in 1952 when over 4000 deaths were attributed to the atmospheric pollution problem, in 1956 when more than 1000 died, and again in 1962 when over 300 lives were claimed for the same apparent reason. New York, Los Angeles and Tokyo, Japan, have all had greatly publicized similar episodes and are having these severe pollution periods with increasing frequency.

There is no doubt that air pollution is a direct result of the combustion or burning process. It is readily apparent that one of the major sources that contribute pollutants is the use of incinerators and the burning of refuse in garbage dumps. This invention is directly related to and concerned with the immediate problem of air pollution and the elimination of same. A highly desirable method and apparatus is presented herein as a non-polluting alternative to incineration. By grinding and compacting waste material (including garbage and trash) rather than burning of same, many tons of pollutants are thusly eliminated from the atmosphere.

The problem of processing garbage and trash has been recognized, at least in part, by the city of New York. There, the use of incinerators in literally thousands of apartment houses will be illegal after a specified date next year. Our invention is easily adapted for use with apartments, department stores, restaurants, office buildings, and all types of public gathering areas for a most efficient non-air polluting processing and disposal of all types of waste material.

In accordance with the instant invention, the first step is the grinding of the waste material. It is contemplated that chutes, similar in nature to and/or actual existing incinerator chutes, be used to channel the waste material directly to the reduction mill-grinder. Since it is hardly possible to restrict the size, shape and character of the waste material that the public may wish to dispose of, the actual grinding or comminuting step is preceded by a waste material volume flow rate controlling means that limits both the size and the amount of waste material that will be simultaneously added to the grinding stage.

The reduction mill is vertically oriented with an open upper end inlet portion. A centrally mounted rotor carries a flat scalloped plate with tearing bars thereon at its upper end portion. This plate tears the bulk waste material into pieces and effectively controls the flow of the material to the final grinding stage. The final grinding stage is comprised of a plurality of flails that pivotally rotate with the rotor and comminute the controlled flow of waste material. The rotation of the flails and the supporting structure create a draft that "blows" the comminuted waste material out of the grinder through an outlet port and into a settling chamber or hopper of a hydraulic compacter.

The compacter operates in a two-stage fashion that includes loading the packing chamber of a cylindrical structure (other shapes are also acceptable) and compacting the comminuted material within the structure. A first hydraulic ram operates in an oscillatory manner to load the packing chamber with the comminuted waste material and to hold the material therein each time the ram is extended. A second ram, whose movement is hydraulically correlated to that of the first ram, is then extended against the material within the packing chamber, thusly compacting same and eventually extruding a high-density, low-volume substance in the form of either a cube or a pellet from the outer end of the extruder-compacter tube. The density of the compacted cube or pellet will be between 50 to 70 pounds per cubic foot, depending upon the type of waste material.

The final end product exiting from the compacter tells an important story of the actual utility of the grinder-compacter combination. For example, since the end product is in the form of a cube or pellet, it is quite easily conveyed and handled and dispensed by completely automated and mechanized means.

Other advantages of the improved waste material processing are readily seen to exist in areas where garbage and trash are not incinerated, but rather are stored in steel bins or any existing space and picked up on a daily basis by city or private sanitation and garbage hauling crews. As the end product of the instant invention represents significantly less volume, storage space (the above-mentioned steel bins for instance) may be greatly reduced. Noxious odors are in turn virtually eliminated since liquid and air are substantially removed from the waste material and the side surfaces "glazed" over by the compacting step. It should be noted that all liquids are drained from the compacter and are allowed to go down existing sewer lines.

The various steps involved in the grinding and compacting of ordinary garbage and trash furnish all the moisture that is needed for efficient compacting and no extra water and/or moisture of any kind need be added to form the finalized pellets or cubes. The nature of the compacted pellets are much less appetizing to rodents and insects and accordingly the breeding grounds and natural habitats for many such pests are eliminated.

A cleaner, healthier atmosphere is not the only by-product of this efficient handling of garbage and trash. In a series of tests, it has been found that the compacted waste material makes excellent land fill in that it provides a more stable base, due to its high density, and does not putrify as does conventional garbage but rather returns to an organic compost of a desirable nature.

In an area where refuse is delivered to a city dump and incinerated therein, the compacted pellets emanating from the grinder-compacters of the instant design require less sophisticated transporting means. In other words, compacter trucks are no longer necessary in trash and garbage hauling because of the already compacted nature of the waste material. Thusly, conventional dump trucks with little or no additional equipment may be used to load and deliver the resultant refuse.

While major electrical power companies have made studies to determine the feasibility of using the compacted high energy waste material as a source of fuel for steam production, the compacted cubes or pellets are not easily subjected to spontaneous combustion nor will they readily burn if small fires are ignited around same. As a result of the general non-combustible nature, the chances of inadvertently starting fires where waste material is allowed to collect such as in apartment houses, department stores, restaurants and the like, are greatly reduced.

Accordingly, one of the primary objects of our invention is to help eliminate air pollution while simultaneously manufacturing a desirable and usable product.

Another more specific object of our invention is to provide a unique method and apparatus for processing waste material which combines the steps of grinding and compacting.

Another object of our invention is to provide an apparatus of the character described which operates most efficiently with a relatively low power requirement. This object is accomplished, in part, by the unique design of a waste material flow rate controlling means which controls the rate and volume of material fed to the final grinding stage, thereby eliminating "slugging" or clogging of said stage. Since a maximum rate of waste material deposited to the final grinding stage is a known factor, the most economical type of motor may be selected for optimum driving of the rotary elements (which includes the final grinding stage).

A further object of our invention is to provide an integrated grinder and compacter with the grinder being specifically designed and constructed to comminute waste material, including garbage and trash, in such a manner that optimum compacting of same is thereby facilitated.

A still further object of our invention is to provide a combination grinder-compacter of the character described that is efficient, low-cost, easy to install, and having a long lived service free period of operation.

A further object of our invention is to provide a combination grinder and compacter of the character described which is designed for continuous running or which may be selectively stopped or started, depending upon the various installation needs.

Other and further objects of the invention, together with the features of novelty appurtenant thereto, will appear in the course of the following description.

Detailed description of the invention

In the accompanying drawings, which form a part of the present specification and are to be read in conjunction therewith, embodiments of the invention are shown and, in the various views, like reference numerals are employed to indicate like parts.

FIG. 1 is a front elevational view of the combination grinder-compacter with portions of the grinder rotor housing and base broken away to show normally hidden components;

FIG. 2 is a side elevational view of the combination grinder-compacter as shown in FIG. 1;

FIG. 7 is a hydraulic circuit diagram showing the operative relationship and control of the two hydraulic rams;

FIG. 8 is an enlarged sectional view taken substantially along the line 8—8 of FIG. 1 in the direction of the arrows, and showing a top plan view of the garbage flow regulating plate; and FIG. 9 is an enlarged sectional view taken substantially along the line 9—9 of FIG. 8 in the direction of the arrows.

Figure 3:
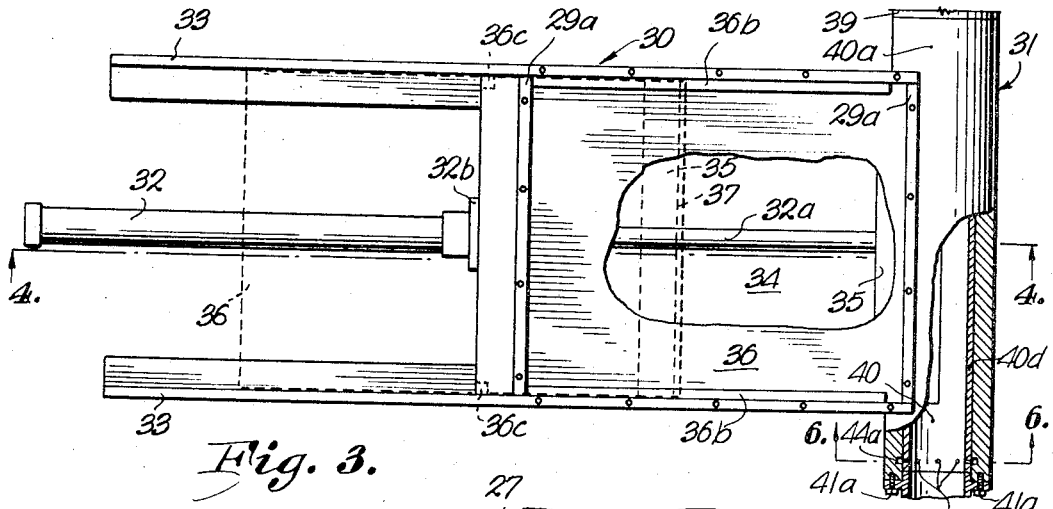
FIG. 3 is a top plan view of the compacter loading ram, hopper and interconnection with the compacter cylinder or tube.

Turning now more specifically to the drawings, FIGS. 1 and 2 disclose the installed grinder-compactor concept and show therein a conventional chute 10. Such a chute may very well be existing incinerator type chutes, such as those commonly found in apartment houses, or they may be special chute duct work added specifically for the instant invention. As a general rule, chute 10 will depend downwardly into the basement or subbasement areas of relatively large buildings. Rubberized bushings 11 interconnect the lower end of each chute with a flared or an inverted funnel-like final chute 12 which is supported from the open upper inlet end of a grinder or reduction mill generally represented by the numeral 13. The bushing 11 successfully damps the motor and grinding noise produced in grinder 13 so that same is not transmitted upwardly via chute 10 to the various individual apartment depositories that feed into chute 10.

The grinder and/or reduction mill is somewhat similar in construction to that shown in the Miner co-pending patent application now Patent No. 3,329,357, issued July 4, 1967. The grinder or reduction mill 13 is elevated by suitable legs 13a which are in turn supported by a base structure 13b which is preferably of a hollow rectangular construction and having an opening at one side thereof for optimum positioning of the compacter as will be described infra.

Reference numeral 14 represents the hollow cylindrical casing or housing of a typical reduction mill embodying the invention. The top of the casing is circumscribed by flanged lip 15 which is welded or bolted to the upper peripheral edge of casing 14. The flared final chute will normally include a mating lower edge with an appropriate gasket (not shown) interconnecting the flange portion (not shown) of lip 15 thusly insuring a firm and rigid connection between the chute and reduction mill.

A main rotor drive shaft 16, same being supported on a similar type bearing arrangement as that shown in the above-mentioned patent application, is journaled near its lower end in thrust bearing 17 and is provided below the bearing with a set of sheaves 18 for driven connection with V-belts 19 which are in turn drivingly connected with motor 20. Motor 20 is of conventional design and is mounted on motor mounting platform 20a, however due to the unique combination of a waste material flow control means with the hammers or flails discussed infra, the horsepower requirement of motor 20 may be held down to around 30 H.P. A torque tube 21 is rotatively connected with the upper end portion of main rotor shaft 16. This tube carries a plurality of symmetrically arranged radially extending rotor arms 22 which in turn support the vertical pins 23 to which the flails or hammers 24 of the mill are pivotally mounted. It should be noted that up until now the physical construction of grinder or reduction mill 13 is substantially the same as that disclosed in the above-mentioned patent application.

Referring conjointly to FIGS. 1, 8 and 9, a substantially circular metal plate 25 is affixed to the vertical extension of the main rotor drive shaft 16 at the upper end portion thereof. As shown by the broken lines in FIG. 8, a key 16a extends upwardly from the upper end portion of shaft 16 and mates with a suitable keyway in the recessed underside of plate 25. A set of three Allen bolts 25a further affix the plate to the main rotor drive shaft. The peripheral edge of the plate contains two diametrically opposite scalloped out portions 25b. When mounted on shaft 16, the normal end extremity of plate 25 will come within approximately one-half inch (½″) of the interior of cylindrical casing 14 and thusly provides a narrow passageway to the final grinding stage. The scalloped or cutout portions of plate 25 (25b) add an additional area or opening in direct communicating relationship with the final grinding stage of grinder or reduction mill 13, that being the hammers or flails 24.

Located partly above the upper surface of plate 25 are two tearing bars 26. These tearing bars extend from a location approximately half way from the central area of plate 25 to the end extremity thereof. Each of the tearing bars slidably fits within an appropriately sized slot 25c so that approximately two-thirds of the height of the bars extends above the upper surface of plate 25. Allen bolts 26a threadably interconnect with plate 25 further securing the tearing bars to plate 25. It should be noted that both the scallops and the tearing bars are oppositely located on diametrically opposed portions of the upper surface of plate 25 so that optimum balance is maintained during the high speed rotation thereof. It will be seen in the discussion infra, that the tearing bars act as their name implies, to tear up large pieces of waste material, be they garbage or trash, and that the rotative effect of the plate centrifugally urges the waste material to the outer edge of the plate and down through either the scalloped openings or the peripheral gap between the outer edge of plate 25 and the inner surface of cylindrical casing 14.

It will be seen that the peripheral gap between the plate and the inner surface of casting 14 as well as the scalloped shape openings may be selectively sized depending on the type of material to be comminuted and disintegrated. Likewise, the power requirement of the final grinding stage (that being the hammers or flails) will in part depend on the passageway dimensions. Accordingly, the rate of flow of the waste material is controlled by the above-mentioned size parameters.

A series of tests have proven that garbage and trash are optimally processed by a combination plate and hammermill casing having the same relative dimensions as that shown in FIG. 8. With the waste material flow to the final grinding stage (flails 24) selectively controlled by means of plate 25, the final comminuting of the waste material is efficiently and optimally carried out by the flails without excessive stress, strain or duty upon the impact mechanism themselves. A removable access door 14b provides easy accessibility for any repair or replacement that might become necessary, however, as a result of the cooperating nature of the flow controlling plate and the flails, down times occur very infrequently due to the nature of the waste material.

Since the plate and flails rotate at a relatively high speed along with rotor arms 22, a considerable down draft is thereby created by the pitch of the rotor arms and same effects the movement of the comminuted material along with the accompanying centrifugal forces. An outlet port 14c, located near the lower end portion and on the side of casing 14, channels all of the transferred comminuted waste material into a vertical standing hollow rectangular sectioned packing settling chamber 27. The settling chamber is vented back to final chute 12 at 28 for air return purposes. Alternatively a "cyclone" type aerating device may be utilized in conjunction with the settling chamber.

Figure 4:
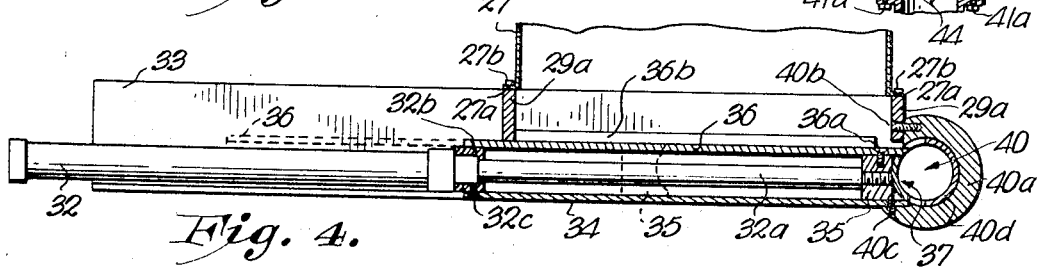
FIG. 4 is a sectional view taken substantially along the line 4—4 of FIG. 3 in the direction of the arrows.

The lower end of the rectangular sectioned settling chamber 27 is flanged at 27a and is connected with a similarly shaped and sized rectangular hopper generally identified by the number 29. Bolts 27b interconnect flange 27a with the upper edge surface of the vertical walls of hopper 29 (FIG. 4). Hopper 29 forms an integral part of the now to be discussed compacting step.

The compacting step of the waste material handling process is essentially a two-stage operation. The first stage is generally designated by the numeral 30 and operates to load the packing chamber of a compacting cylinder or tube discussed infra. The second stage, including the packing chamber, is generally indicated by the numeral 31.

Referring in more detail to the loading stage 30, a hydraulic cylinder 32 having an extendible ram 32a of selected length is positioned with the extended ram below hopper 29. A pair of structural angles 33 are interconnected with opposed sides of hopper 29. As seen in FIGS. 3 and 4, spacer structurals 29a are weldedly interconnected between the vertical portions of the two parallel angles 33 at the right hand end thereof and also near the center portion of the two angles. Spacers 29a cooperate with the vertical portions of angles 33 to form the rectangular hollow box-like structure (hopper 29) that interconnects with the lower portion of settling chamber 27.

A flat plate 34 is rigidly affixed between the horizontal portion of the two angles 33 and supports the forward end of hydraulic cylinder 32 on a central portion of its left hand edge portion. The forward end of hydraulic cylinder 32 extends through a circular aperture in block 32b, same being securely bolted at 32c to the left side portion (FIG. 4) of lower plate 34. The rear of the hydraulic cylinder 32 may be (not shown appropriately affixed between the two angles 33 thereby firmly positioning the cylinder and its associated piston 32a in a fixed position relative to hopper 29.

Located on the forward or right hand end, as seen in FIGS. 3 and 4, of ram 32a is a transversely extending block 35. The forwardmost end of the ram 32a makes a threaded connection with block 35, generally rectangular in cross section, so that the lower surface of the block slidably contacts the upper surface of bottom plate 34. An upper plate 36 is connected along its forward or right hand end portion to block 35 by a plurality of set screws 36a. It should be pointed out that the height and dimension of the block 35 is so selected that when ram 32a is withdrawn within hydraulic cylinder 32, the upper plate 36 is free to move thereover in a telescoping manner. Guides 36b further restrict the movement of the ram within the prescribed area. In some instances, it is desirable to affix plate supports 36c to the vertical portions of angles 33 so that plate 36 is supported at its rearward or left hand end portion (FIG. 4) during the extending of ram 32a. This combined structure insures that the weight of the comminuted waste material on plate 36 will not deflect the same downwardly into contact with cylinder 32 during the retraction of ram 32a.

The forwardmost end of the combination upper plate 36 and transverse block 35 has an inwardly curved outer face plate 37 extending the length of the right hand or forward edge of the combination plate and block and weldedly connected thereto. This curved and arcuately sectioned face plate resembles a section of pipe that has been longitudinally cut from the whole and initially contacts the comminuted waste material to force same into the packing chamber of the compacting stage 31, infra.

Figure 5:
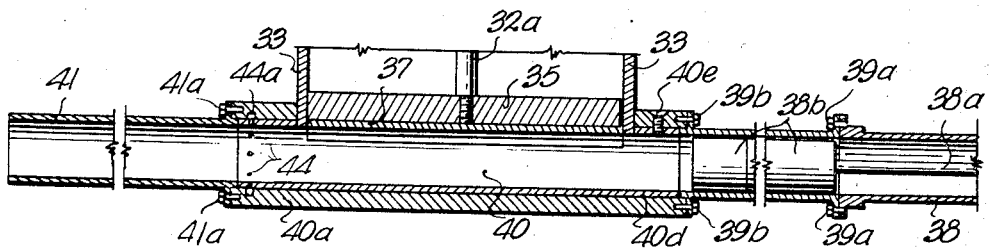
FIG. 5 is an enlarged sectional view taken substantially along the line 5—5 of FIG. 2 in the direction of the arrows.

Turning now to the construction of the compacting cylinder or tube which has been generally indicated by reference to the compacting stage 31, this stage in fact includes a second hydraulic cylinder 38 and a plurality of interconnecting tube sections 39, 40a and 41, extending from the forward end and rigidly connected thereto. The forward end of the hydraulic cylinder 38 is affixed to the packing cylinder mount 39 by means of aligning the circular flanges and bolting same together at 39a. The forward end of packing cylinder mount 39 is also flanged and is bolted at 39b to the outer cylinder 40a of the packing chamber 40. In a similar manner, the packing barrel 41 bolts at 41a to the outer cylinder 40a of the packing chamber. Hydraulic cylinder 38 (FIG. 5) operates to extend and withdraw ram 38a and its elongated compacting head 38b on the outer end thereof throughout the length of packing chamber 40. In actual practice, head 38b is constructed in two sections (the outer section being replaceable) and its combined length slightly more than the slotted or cut-out orifice to packing chamber 40. The packing cylinder mount 39 is sufficiently long to allow the entire retraction of head 38b therewithin. This construction insures that no material will fall behind the packing head and disrupt the operation thereof.

As best seen in FIGS. 1 and 2, the compacter base support generally designated by the numeral 42 inclines the entire compacting stage (31) from the hydraulic cylinder to the packing barrel 41. As will be seen, by elevating the portion of packing barrel 41 relative to the hydraulic cylinder 38, any unwanted liquid derived from the compacting stages is allowed to drain out liquid drain 43 and into the conventional and available sewer lines (not shown).

Turning now to a detailed description of the packing chamber, the outer cylinder 40a is appropriately cut-out or apertured as shown in FIGS. 3 and 4, for a fixed connection with the lower plate 34 and the forward spacer bar 29a. Countersunk bolts 40b and 40c interconnect the outer cylinder with spacer bar 29a and lower plate 34, respectively. In this manner, the loading stage 30 is fixedly connected to the compacting stage 31 and the cut-out or apertured portion of outer cylinder 40 performs as an orifice to facilitate the loading of the comminuted waste material therewithin.

As best seen by looking at both FIGS 3 and 4, the cut-out or slotted portion of outer cylinder 40a is located on a substantial portion of the left hand side. A packing chamber lining 40d is designed to be placed within the outer cylinder 40a and likewise has a substantial portion of its left side cut out or slotted. The outer diameter of packing chamber liner 40d is so selected that the liner may be slidably positioned through either end of the packing chamber and secured thereto with a suitable threaded set screw 40e that extends through aligned apertures in both the outer cylinder and liner 40d. The inner diameters of outer cylinder 40a and liner 40d is so selected that the inner diameters of liner 40d, packing cylinder mount 39 and the packing barrel 41 will all be in alignment, thereby presenting an unrestricted surface for the movement of the compacting ram head 38b.

When positioned in its proper place, liner 40d will present its slotted or opened face adjacent the slotted portion of outer cylinder 40a of packing chamber 40. Thusly, when the packing chamber 40 (outer cylinder 40a and liner 40d) is affixed to the loading stage 30 in the manner described above, the evacuated chamber of same is in communicating relationship with the loading stage. Extending of ram 32a will load the evacuated packing chamber with the comminuted waste material and curved surface 37 located on the outer end portion of ram 32a forms a fixed wall for the compacting of same therewithin.

Figure 6:
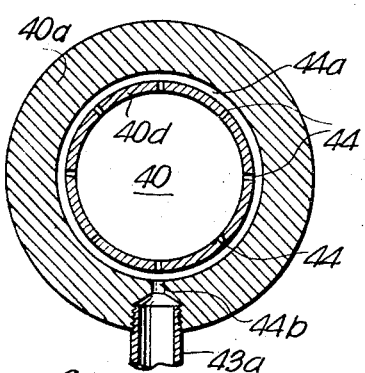
FIG. 6 is an enlarged sectional view taken substantially along the line 6—6 of FIG. 3 in the direction of the arrows.

The forward or left hand end portion (FIGS. 2 and 5) of packing chamber 40 contains a weep or drainage port. This port is constructed by selectively aperturing the liner 40d at 44 (see FIGS. 3, 5 and 6) in the same vertical plane. These apertures are in communicating relationship with a ring slot 44a which circumscribes the outer diameter of liner 40d around apertures 44. This ring slot (44a) has a communicating passage 44b and a larger internally threaded port extending from passage 44b through to the outer surface of outer cylinder 40a. The internally threaded port facilitates the threaded connection with the liquid draining tap 43a and line 43. As will be seen, any liquid resulting from the compacting step will be allowed to drain through apertures 44 into the ring slot 44a and eventually out draining tap 43a, line 43 and into a conventional sewage line.

In summary, it has been found that by comminuting and compacting waste material, which in all probability includes garbage and trash of all kinds, that the volume of the waste material can be reduced on the order of 25 to 1 or 30 to 1. For instance, the embodiment disclosed fulfills a desperate need in garbage and trash processing for apartment houses. It is contemplated that the usual chutes 10 be interconnected with disposal doors in the various apartments throughout a building, or, alternatively, having only one central waste dumping door for a medium to small apartment house. Any type waste material including bottles, cans, newspapers, bones and garbage of all kinds may be disposed of by simply opening the appropriate door and dropping same down the existing chutes.

Studies have shown that it is more economical to allow the 30 H.P. reduction motor 20 to be on continuously. In this instance, when the waste material, either as individual items or packaged in bulky containers, reaches the high speed rotating plate 25 and contacts the tearing bars 26, the waste material will be torn into a grindable size. The flow rate of torn or shredded waste material is delivered to the final grinding stage in a controlled manner governed by the sizes of the peripheral gap passages and the scallops in plate 25. The final grinding stage, which comprises the flails or hammers 24, further grinds and comminutes the controlled flow of the waste material from plate 25 and forcibly delivers the now comminuted waste material into settling chamber 27. Since the settling chamber 27 is in communicating relationship with hopper 29 of the loading stage 30 of the compacter, the comminuted material essentially rests upon upper plate 36 when hydraulic ram 32a is extended as shown in FIG. 4. When ram 32a is retracted within hydraulic cylinder 32, the comminuted waste material falls to the upper surface of bottom plate 34 and rests thereon until ram 32a is once again extended. The extension of ram 32a hydraulically forces the comminuted waste material into the exacuated interior of packing chamber 40. At this point, the curved outer end of ram 32a (37) forms the outer constricting boundary of the packing chamber and hydraulic ram 38a is extended approximately the full length of the packing chamber, thusly compacting the comminuted waste material within the chamber and forcing same into packing barrel 41. The retraction of ram 38a simultaneously results in the retraction of ram 32a and the process is ready to be repeated in an oscillatory manner.

As the combined operation of comminuting and compacting continues, the compacted, high density waste material eventually is extruded from the open end of packing barrel 41. Of course, many different diameter sizes may be used in the compacting stage 31, however, we have found that a three inch (3″) inner diameter in the compacting stage is very suitable for processing most waste products. With such an arrangement, the compacted waste material will exit from the end of packing barrel 41 in pellet form having a three inch (3″) diameter and will break off every four to six inches (4″ to 6″). It is contemplated that deflector plates may be used on the end of barrel 41 if other (either larger or smaller) pellet sizes are desirable.

Looking now at FIG. 7, the compacting and loading stages are hydraulically controlled by the circuit schematic shown therein. The hydraulic system will include a constant volume hydraulic pump 45 located in reservoir R that is driven by an approximately 5 H.P. electric motor 46. Relief valve 47 is used to protect the system from overload and is set for a maximum system pressure of 1600 p.s.i. With both of the hydraulic rams withdrawn within their respective cylinders, hydraulic fluid flows from pump 45 through the pilot-operated four-way valve 48 in the position shown. This results in the immediate extending of ram 32a and the building up of pressure in this part of the system until it reaches a preset value of approximately 250 p.s.i. The hydraulic fluid will then flow through relief valve 49 and operate to extend hydraulic ram 38a from cylinder 38. Check valve 49a is provided for safety reasons as is evident by its parallel relationship to valve 49. Thusly, the comminuted waste material is being compacted within packing chamber 40 and forced into packing barrel 41 under properly controlled pressure.

The compacting stroke or the extension of ram 38a from cylinder 38 is carried out until the fluid reaches a preset pressure of approximately 1200 p.s.i. At which time relief valve 50 opens causing a fluid flow to be directed to a second four-way valve 48a. Valve 48a is thusly moved to the position shown in FIG. 7 so that fluid flow from pump 45 therethrough to valve 48 changes its indicated position. The fluid is now directed by the right hand portion of valve 48 to retract both rams within their respective cylinders at the same time. With both rams retracted, the pressure of approximately 600 p.s.i. is reached in relief valve 51 and the fluid is directed therethrough to the second four-way valve 48a moving its left hand position into communicating relationship with pump 45. This results in moving valve 48 to its original position (FIG. 7) and allowing the cycle to start over again.

Solenoid valves 52 and 53 can be manually controlled by means of electric switches. When either of these valves is activated, the four-way valve 48 cannot operate allowing the operator to develop a maximum system pressure to clear all obstructions. Numeral 54 represents orifices to allow oil to return to the reservoir enabling valve 48a to operate. It has been found that under such a hydraulic control with the above values given, that the system should complete 9.6 cycles per minute.

As mentioned supra, the high density, low volume compacted waste material may be automatically conveyed to storage bins and dump chutes for loading into dump trucks and the like. Since substantially all the excess liquids and air have been removed from the end product, the compacted waste material may be stored for some time without emanating noxious odors and putrification is slowed down considerably. This allows the compacted material to be disposed of at the will and the convenience of both apartment house or business establishments and the usual city sanitation or garbage disposal crews.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of processing waste material including garbage and trash such as cans, glass bottles, vegetables, synthetic and natural fibrous material, wet and dry sticky materials and the like, comprising the steps of
comminuting said waste material into substantially smaller particles without the use of sizing screens,
transferring said comminuted particles to a compacter through an unrestricted discharge opening from said comminuting step, and
compacting said particles into a substance having a volume substantially less than the original volume of said waste material.

2. The invention as in claim 1, wherein said comminuting of said waste material includes the steps of
regulating the volume of flow of said waste material to a final grinding stage, and grinding said flow regulated waste material into substantially smaller particles.

3. The invention as in claim 1 wherein the compacting of said comminuted particles includes the steps of loading the packing chamber of a compacter with said comminuted particles and hydraulically compacting said particles within said packing chamber thereby substantially reducing the volume of said waste material.

4. The invention as in claim 3 including the steps of draining excess liquids which may occur as a result of said compacting steps from said packing chamber to conventional sewer lines and ejecting said compacted substance from said compacter as additional comminuted particles are compacted.

5. Apparatus for processing waste material including garbage and trash, comprising
a reduction mill, said reduction mill having at least a grinding stage and a means for regulating the volume of flow of said waste material to a final grinding stage of said mill, said regulating means including a flow plate centrally mounted within said reduction mill and operable to tear said waste material into volumetric proportions of a selected size before passing same to said final grinding stage, said grinding operable to comminute said waste material into substantially smaller particles for the eventual compacting of same,
means for transferring said comminuted waste material from said reduction mill, and
a means for compacting said transferred particles into a substance having a substantially smaller volume than the original volume of said waste material.

6. The invention as in claim 5 wherein said reduction mill comprises a rotor housing having an open upper inlet end portion and a lower discharge port, a vertical rotor centrally mounted in bearings supported from said housing, means for driving said rotor, and, wherein said regulating means includes said plate centrally mounted on and rotatable with said rotor, said plate having its outer peripheral edge extending in closed proximity to the inner surface of said rotor housing thereby forming a spaced gap therebetween, said plate operable to tear said waste material into a regulated volume of flow of same through said gap to said final grinding stage.

7. The invention as in claim 6 wherein said plate is scalloped along its edge at diametrically opposite portions thereof, said scalloped portions and said spaced gap between the peripheral edge of said plate and said housing thereby providing a transfer passage from said upper surface of said plate to said final grinding stage.

8. The invention as in claim 7 wherein said plate has at least two tearing bars affixed thereto on its upper surface, said tearing bars operable to reduce the particle size of said waste material as said waste material comes into contact with same, said scalloped plate and said gap controlling the volumetric mount of said waste material that is delivered to said grinding stage.

9. The invention as in claim 8 wherein said final grinding stage includes a series of flail members pivoted at the extremities of a plurality of arms rotatably connected to said rotor.

10. The invention as in claim 5 wherein said compacting means includes
a loading hopper,
a first hydraulically operated ram,
a second hydraulically operated ram,
a compacting tube having a packing chamber located therein, said loading hopper operable to receive said comminuted waste material from said reduction mill and to transfer same to a position adjacent said first ram, said first ram operable to load said comminuted waste material into said packing chamber, said second ram operable to compact said comminuted waster material within said compacting tube.

11. The invention as in claim 10 wherein said first ram has a comminuted waste material loading surface substantially the same size as a loading slot in said packing chamber, said first ram operable to form a rigid closure of said slot in said packing chamber during the compacting of the comminuted waste material therewithin by said second ram.

12. The invention as in claim 11 wherein said packing chamber includes a removable lining concentric to the shape of said tube, said lining containing a plurality of apertures at one end thereof, means for draining liquid located interiorly of said lining through said apertures, and means for supporting said tube at an angle relative to the horizontal.

References Cited

UNITED STATES PATENTS

| | | |
|---|---|---|
| 537,909 | 4/1895 | Stauber. |
| 657,607 | 9/1900 | Luzatto. |
| 692,605 | 2/1902 | Bratton. |
| 2,087,435 | 7/1937 | Hubbert _____ 100—97 |
| 2,151,855 | 3/1939 | Kobold _____ 100—232 XR |
| 2,810,181 | 10/1957 | Ruckstuhl. |
| 3,131,040 | 4/1964 | Dunn et al. _____ 100—110 XR |
| 3,192,853 | 7/1965 | O'Connor _____ 100—39 |
| 3,214,105 | 10/1965 | Owens et al. _____ 241—154 |
| 3,277,850 | 10/1966 | Jackson et al. |

BILLY J. WILHITE, *Primary Examiner.*

U.S. Cl. X.R.

100—39, 42, 52, 97, 126, 232, 269; 241—154, 285